United States Patent [19]
Asai

[11] 4,278,291
[45] Jul. 14, 1981

[54] ADJUSTABLE HEADREST

[76] Inventor: Kozo Asai, 5-7, Matsuekita 7-chome, Wakayama, Wakayama, Japan

[21] Appl. No.: 5,866

[22] Filed: Jan. 23, 1979

[51] Int. Cl.³ .............................................. A47C 7/38
[52] U.S. Cl. .................................... 297/391; 297/216
[58] Field of Search ............................... 297/112–115, 297/406, 407, 411, 430, 431, 439, 391, 409, 216

[56] References Cited

U.S. PATENT DOCUMENTS

| | | | |
|---|---|---|---|
| 1,869,765 | 8/1932 | Mitchell | 297/391 |
| 1,977,159 | 10/1934 | Tursi | 297/112 |
| 2,215,758 | 9/1940 | Knight et al. | 297/115 |
| 2,514,798 | 7/1950 | Rowe | 297/113 X |
| 2,973,029 | 2/1961 | Schlosstein | 297/216 |
| 3,310,342 | 3/1967 | Drelichowski | 297/216 X |
| 3,637,253 | 1/1972 | Maule et al. | 297/115 X |
| 3,802,737 | 4/1974 | Mertens | 297/216 |

FOREIGN PATENT DOCUMENTS 282313  2/1931  Italy ........................................ 297/431

*Primary Examiner*—Francis K. Zugel
*Attorney, Agent, or Firm*—Eric P. Schellin

[57] ABSTRACT

An adjustable headrest is disclosed in which a slider forming a headrest is slidably inserted into a hollow open ended casing or a space formed between left and right holding walls, or a sliding casing formed as a headrest is slidably fitted to the outside of a support fixed at the back of the seat. Disposed at suitable places between the casing and the slider are a sliding guide mechanism for the slider and engagement means for fixing the slider at the desired position in order to effect adjustment. A sliding guide mechanism permits the headrest to readily move telescopingly out of the casing. In particular, when the device of the present invention is used in conjunction with the headrest of a car seat, such headrest may be positioned so as to be generally always in contact with the head of a driver. Furthermore, in at least one embodiment there is a provision of springs for normally spring-loading the slider to the forward direction which permits the shock produced when a car is struck from behind, to be absorbed by such springs, thus increasing safety and minimizing injury.

5 Claims, 4 Drawing Figures

ADJUSTABLE HEADREST

BACKGROUND OF THE INVENTION

The present invention relates to a device for an adjustable headrest of a seat, especially for an automobile.

For example, a conventional headrest is usually attached to the upper portion of the back of an automobile seat for the purpose of prevention of whiplash when the car is struck from behind. However, the person in the automobile usually sits forwardly of the conventional headrest so that his head is far from being in contact with the headrest even though he may lean into the seat of the back. It should therefore be noted that his head will not be properly protected in the event the automobile is struck from behind. In particular, when a reclining seat is used as shown in FIG. 1, the distance between the driver head and the headrest is rather dimensionally quite large.

SUMMARY OF THE INVENTION

The present invention is proposed in view of the abovementioned background.

It is an object of the present invention to provide a device for readily and securely adjusting horizontally the headrest of a car seat or a seat for a barber's shop or a beauty shop in the forward and backward directions.

BRIEF DESCRIPTION OF THE DRAWINGS

Above and other objects and advantages of the present invention will be apparent from the following description referring to the accompanied drawings, in which.

DETAILED DESCRIPTION OF THE INVENTION

Figure 1:
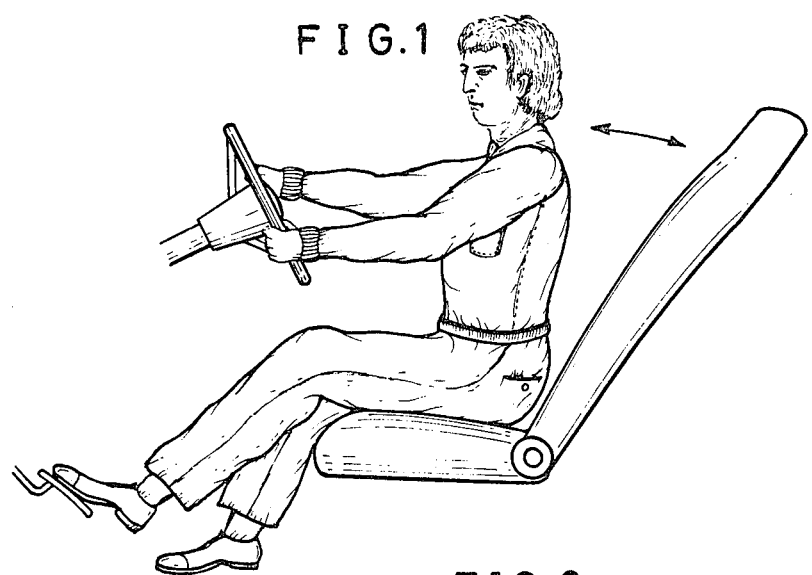
FIG. 1 is a left side view showing the driving posture of a driver.
Figure 2:
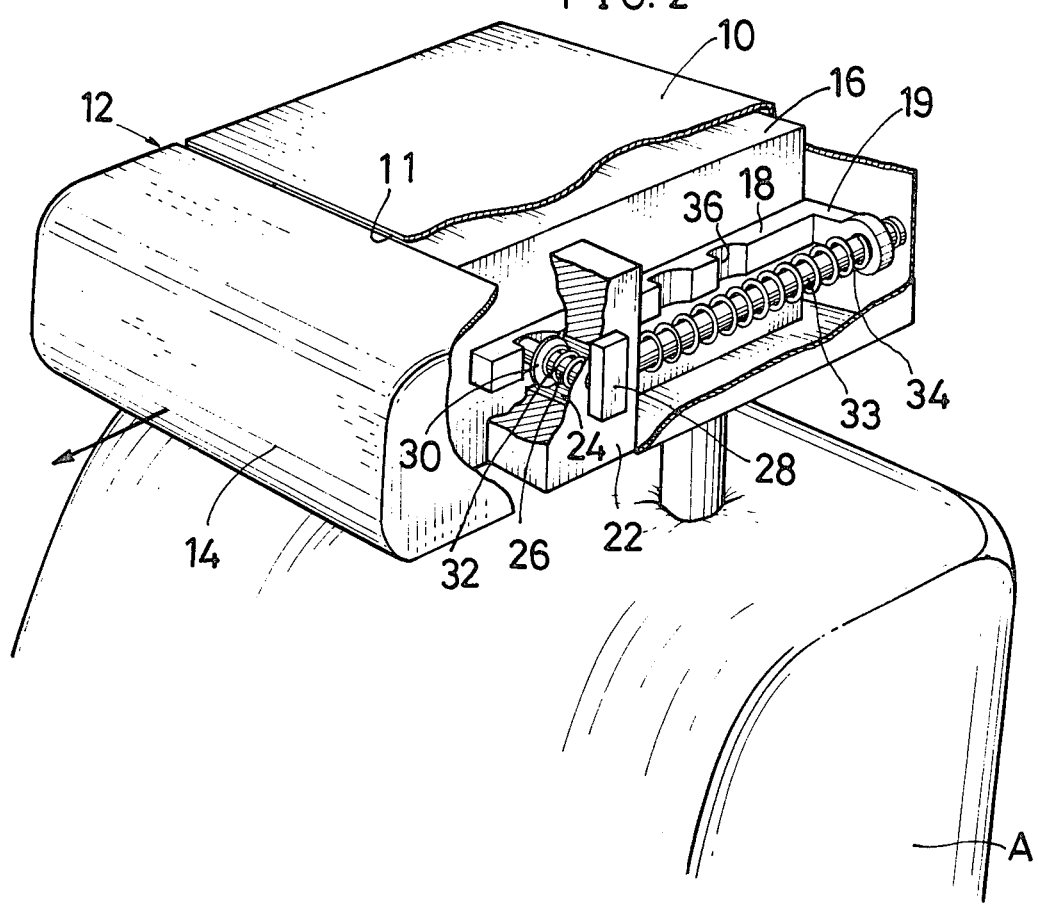
FIG. 2 is a perspective view with portions broken away of a first embodiment of the present invention.
Figure 3:
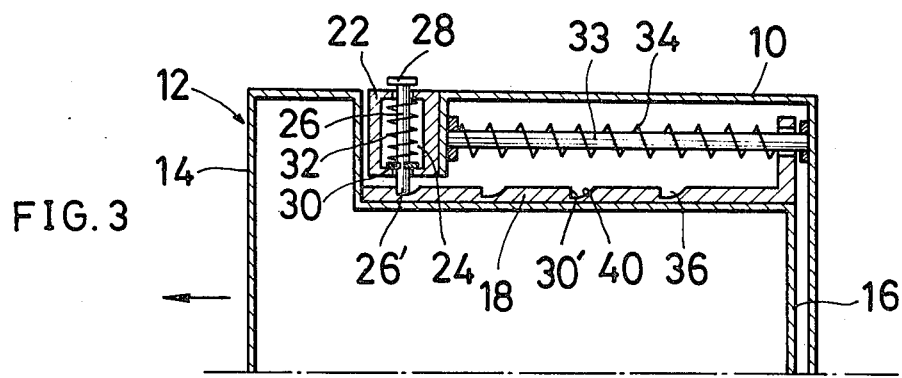
FIG. 3 is a cross-section view of main portions of the first embodiment.

In FIGS. 2 and 3 showing a first embodiment, a box-shaped casing 10 made of suitable material such as metal and the like is mounted at the upper surface of a seat A by suitable and conventional means and has a front opening 11. A slider 12 forming a headrest is slidably inserted into the casing 10 in a forward/backward movable manner. The slider has a forward extending portion which comprises a headrest 14 adapted to be in suitable contact with the head of a driver. The slider has a base 16 having a width somewhat narrower than the width of the headrest 14.

In this embodiment, the width of the headrest 14 is substantially the same as that of the casing 10, and when the slider 12 is inserted into the casing 10, the base 16 is completely housed in the casing 10 but the headrest portion 14 remains outwardly projected therefrom. The width of the headrest 14 may be the same as that of the base 16, that is, may be narrower than that presented in this embodiment.

The base 16 is provided at each of its left and right sides thereof, that is, in the space between the casing and the base 16, with a relatively thick L-shape member 18. At one end thereof there is a tip having a ring 19. Internally, the casing 10 is provided with a hollow block 22 at each of the left and right sides of the opening 11 thereof. Each block 22 is provided at the inside thereof with a bore 24 substantially at right angles to the sliding direction of the slider 12 and which extends externally of the casing.

A short pin 26 is slidably mounted in the bore 24. Each pin 26 possesses a knob 28 that is secured to one end thereof to act as a handle and is positioned externally of the casing 10. Proximately the other end portion of the pin there is a radially extending flange 30 which is positioned internally of the block 22. The tips of the pins 26 are normally spring-loaded inwardly toward the inside of the casing by helical springs 32 fitted concentrically of the pins 26.

A horizontally disposed rod 33 is positioned at each of the left and right sides of the casing 10 and extends in the sliding direction of the slider 12. The rods 33 have one end of each passing through the rings 19 of the L-shape members 18 and the other end of each secured externally of the blocks 22. The rods are adapted and constructed to form a guide mechanism for moving the slider in a forward/backward direction when applicable to the headrest embodiment of the present matter. Helical springs 34 are fitted concentrically with the rods 33 between the blocks 22 and the vertical portions 19 of the L-shape members 18.

As best shown in FIG. 3, notches 36 are disposed at those sides of the L-shape members 18 which are in contact with the sides of the slider 12. Each of the notches 36 is defined by a vertical portion 30' at the front side and an arcuate portion 40 extending rearwardly from the bottom of the vertical portion 30'.

When the tips 26' of the pins 26 are engaged in the notches 36, the slider 12 may be forwardly moved as the pins will ride out of the notches as the slider is pulled forwardly. When intending to telescope the slider 12 to be housed in the casing 10, it is necessary to disengage the pins 26 from the notches 36 which is accomplished by pulling on the knobs 28 of the pins 26 to retract them from the notches. When the pins are released, the slider 12 is automatically telescoped to be completely housed in the casing 10 because the L-shape members 18 and the slider 12 are seen to be normally spring-loaded to the backward direction by the springs 34.

Attention is now directed to the operation of the first embodiment.

The headrest 14 of the slider 12 may be pulled out and fixed at the desired position so as to be in contact with the head of a user or near thereto. When the pins 26 are outwardly pulled out from the notches, the headrest 14 is driven backwardly by the springs 34.

As thus described, the first embodiment is so constructed that the casing 10 is provided at the left and right sides thereof with the rods 33 which are slidably passed through the rings disposed at the slider 12, whereby transversely balanced slide may be possible. In addition, since the springs 34 are disposed at the positions abovementioned, when the pins 26 are engaged within the notches 36, the slider 12 is normally spring-loaded in the retractable direction by these springs 34, so that the slider 12 may securely be fixed at a predetermined position. It is to be noted that the slider 12 is retracted by the springs 34 without manually forcing it back.

Figure 4:
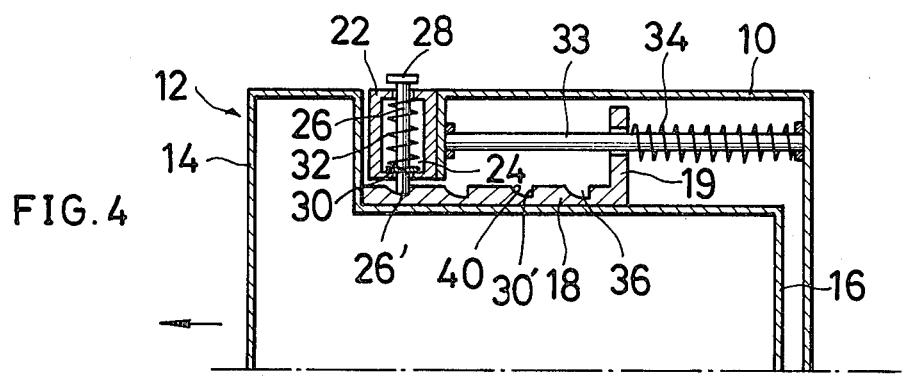
FIG. 4 is a cross-section view of modified main portions of the first embodiment.
Figure 5:
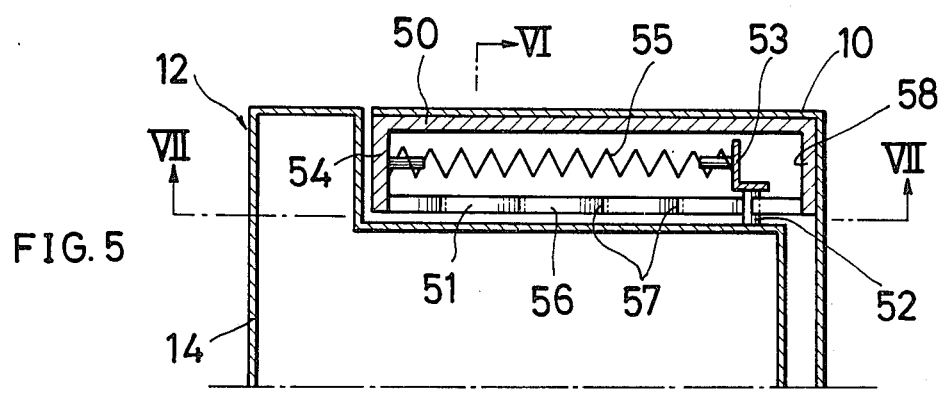
Figure 6:
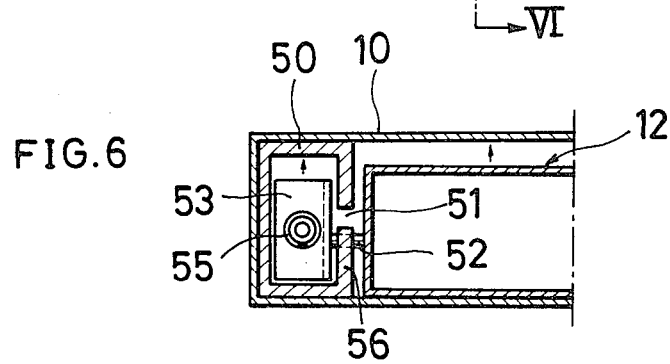

In another embodiment, springs 34 may be disposed between the rear wall of the casing 10 and the vertical ring carrying portions 19 of the L-shape members 18 as shown in FIG. 4. In this case, the spring-load may be applied to the front direction, contrarily to the embodiment shown in FIG. 3. It will therefore be necessary to provide the notches 36 at the L-shape members 18 in the direction opposite to that in FIG. 3. The slider 12 is then normally pressed to the forward extending direction; namely, when the pins 26 are disengaged from the notches 36, the slider 12 will be moved in the forward direction. In such arrangement as shown in FIG. 4 wherein the head of a person is normally pressed to the forward direction by the slider 12, shock given when the car is struck from behind, will be absorbed by the springs, thus permitting to increase the safety effect.

The present invention may also be embodied in such a way that a member designated as the slider in the embodiments discussed hereinbefore is fixed, as a support, at the back of a seat, and a member designated as the casing is slidably fitted, as a slider, to the outside of the support, and a headrest is disposed at the front of this slider. In such embodiment also, there may be suitably disposed engagement means for fixing the slider at the desired position and springs for spring-loading the slider 12 to either forward or backward sliding direction.

It is to be noted that not only compression springs but also tension springs may be used in all embodiments discussed hereinbefore and may be substituted for the former.

In accordance with the present invention arranged as discussed hereinbefore, movement of a headrest in the forward and backward direction may be readily made. In particular, when the present invention is embodied as the headrest of a car seat, such headrest may be readily positioned so as to be always in contact with the head of a driver. Provision of springs for normally spring-loading the slider to the forward direction permits shock presented when a car is struck from behind, to be absorbed by such springs, thus permitting to increase the safety effect.

What is claimed is:

1. An adjustable headrest abutment device comprising:
   (a) a housing having right and left side walls, upper and lower walls, and a rear wall, each being connected with each other to define a box-like configuration with an open front end,
   (b) right and left block means restricting said open front end, said right block means being connected to said right side wall and said left block means being connected to said left side wall, said right and left block means being connected to said upper and lower walls at the open front end of said housing,
   (c) a slider means having right and left side walls, upper and lower walls each being connected with each other to define a box-like configuration, slider walls being dimensioned to slide in the restricted open front end of said housing, where the dimensions of said slider being slightly less than said restricted open front end, and a headrest means on one end of said slider means covering the open end of said housing defined by said right and left side walls and said upper and lower walls,
   (d) a right side space defined by said housing right side wall, said rear wall, said upper and lower walls, said right block means and said right side wall of said slider means,
   (e) a left side space defined by said housing left side wall, said rear wall, said upper and lower walls, said left block means and said left side wall of said slider means,
   (f) a pair of internal slide guide bar means positioned along the direction of sliding of said slider means in said right and left spaces where one of said slide guide bar means is secured to said rear wall and to said right block means, and the other of said slide guide bar means is secured to said rear wall and said left block means,
   (g) a pair of engagement locking means on said side walls of said slider means and slidably connected to said slide guide bar means to lock said slider means at a selected desired position, one of said engagement locking means being mounted to said right side wall and the other of said engagement locking means being mounted to said left side wall,
   (h) means on said pair of slide guide bar means to urge said slider means in a desired direction.

2. The device of claim 1 wherein said pair of engagement locking means are provided with strips having a plurality of detents, said right and left block means having latching means for engaging said detents at a selected desired position, and means on said latching means for releasing said engagement locking means.

3. The device of claim 2 wherein said detents on said engagement locking means have abutments engaged by said latching means to lock said slider means in a selected desired position where said means to urge said slider means pushes said abutments into engagement with said latching means.

4. The device of claim 3 wherein said means to urge said slider means in a desired direction are mounted on said sliding guide bar means between said block means and said engagement means to urge said slider means in a normally retracted position into said housing.

5. The device of claim 3 wherein said means to urge said slider means in a desired direction are mounted on said sliding guide bar means between said rear wall and said engagement means to urge said slider means in a normally extended position out of said housing.

* * * * *